Nov. 29, 1927.

J. T. BEECHLYN 1,650,591

LIGHT PROJECTOR USING FRESNEL LENS

Filed July 24, 1922

Inventor:
John T. Beechlyn,
by *Allen B. Davis*
His Attorney.

Patented Nov. 29, 1927.

1,650,591

UNITED STATES PATENT OFFICE.

JOHN T. BEECHLYN, OF BOSTON, MASSACHUSETTS, ASSIGNOR TO GENERAL ELECTRIC COMPANY, A CORPORATION OF NEW YORK.

LIGHT PROJECTOR USING FRESNEL LENS.

Application filed July 24, 1922. Serial No. 577,155.

My invention relates to improvements in light projector equipment. More particularly it relates to that type of projector in which a Fresnel lens is used.

It is a fact that when light is projected on a screen through a Fresnel lens, the distribution of the light on the screen appears in rings, some darker than others. The dark rings correspond to the grooves on the back side of the lens. I have found that by using a reflector of a certain construction in front of the lens I can materially increase the luminous intensity of the screen by directing rays from beyond the subtending area of the lens in such a manner as to be directed to the lens and to be refracted by said lens to the said dark areas. I accomplish this by causing a reflector to so direct these outlying rays as to pass through the lens and emerge through the inner sides of the grooves in the lens. Among the objects of my invention therefore are to provide in combination with a Fresnel lens a reflector for increasing the luminous intensity of a beam of light from a projector of the above character and to increase the efficiency of a projector of said type with a given source of light; and to provide other details of improvement tending to increase the efficiency and serviceability of a light projector of the above character.

Figure 1:
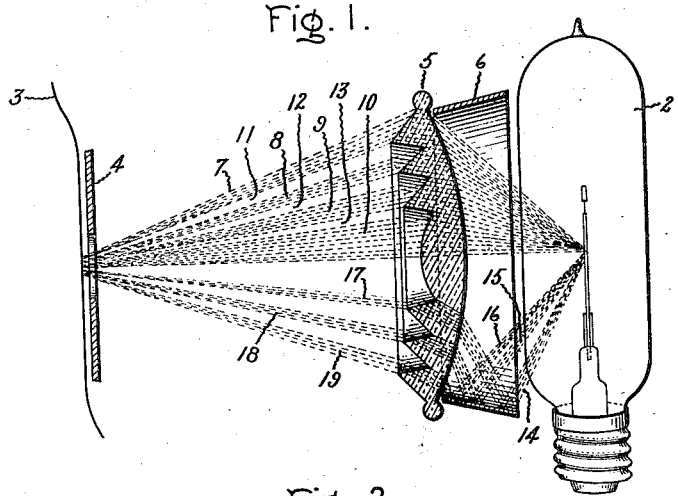
Figure 2:
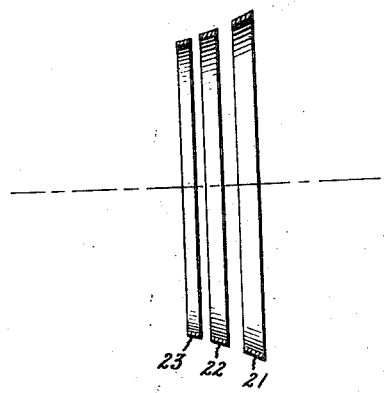

The means for accomplishing the foregoing and other useful ends are more fully set forth and claimed in the accompanying specification. Referring to the drawing accompanying the specification, Fig. 1 is a view in elevation and partly in section of the projector device of my invention shown in combination with a moving picture aperture film—the screen not being shown. Fig. 2 is a section in elevation of another form of the reflector which I contemplate using with a Fresnel lens.

Referring more in detail to the accompanying drawing it will be seen that at the right, Fig. 1, is shown an electric lamp 2 used as a light source. At the left I show a moving picture film 3 and an aperture plate 4. Between the light source and the film is located a Fresnel lens 5 and between the lens and the light source I provide a reflector 6. It will be observed, as indicated in the drawing, that the lens splits up the light into a series of beams such as the beams 7, 8, 9 and 10 having a series of dark rays 11, 12 and 13 in between. By providing the reflector 6, I gather the rays of light beyond the lens such as the rays in bands 14, 15 and 16 and reflect them through the lens which in turn refracts them, causing them to emerge respectively as rays in bands 17, 18 and 19. These bands correspond to the dark bands 13, 12 and 11 and are superimposed thereon, so to speak, thus increasing the luminous intensity of the beam from the lens as a whole and more evenly distributing the light throughout the beam area. In the drawing, Fig. 1, I have represented the reflector as a continuous conical surface. I find however that the reflector can be formed of a series of disconnected conical bands, one band, for example, as wide as the beam 14, Fig. 2, another band as wide as the beam 15 and another as wide as the beam 16. It is not essential that there be any reflecting surface between the bands. I wish to point out that the band corresponding to the beam 16 may be inclined two or three or more degrees to the axis of the reflector and that the band corresponding to the beam 15 may be inclined still slightly more. Similarly, the band corresponding to the beam 14 may be inclined still a few degrees more and so on. The sectional construction of the reflector 6 is clearly indicated in Fig. 2 wherein the bands 21, 22 and 23 corresponding to the beams 14, 15 and 16 are shown. The width and inclination of these bands it will be understood will vary more or less with the character of the source of light.

I find that by the use of this simple device I can materially increase the efficiency of a light projector device of the above character by increasing the intensity of the beam and by more uniformly distributing the light over the beam area than can be done with a Fresnel lens alone.

What I claim as new and desire to secure by Letters Patent of the United States, is:

In a light projector, in combination, a corrugated lens having steps and risers, a conical mirror located between the lens and the light source, the focus of the steps of the lens and the focus of the risers of the lens and of the mirror in combination being substantially the same, whereby rays from the light source striking the lens directly pass through the lens and are refracted into concentric conic beams, and rays that strike the lens after being reflected by the mirror are refracted by the lens into concentric conic beams falling between the first mentioned conic beams.

In witness whereof, I have hereunto set my hand this 20th day of July, 1922.

JOHN T. BEECHLYN.